US011968707B2

(12) United States Patent
Jiao et al.

(10) Patent No.: US 11,968,707 B2
(45) Date of Patent: Apr. 23, 2024

(54) COMMUNICATION METHOD AND COMMUNICATION APPARATUS

(71) Applicant: HUAWEI TECHNOLOGIES CO., LTD., Guangdong (CN)

(72) Inventors: Shurong Jiao, Shanghai (CN); Meng Hua, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 345 days.

(21) Appl. No.: 17/466,635

(22) Filed: Sep. 3, 2021

(65) Prior Publication Data

US 2021/0400685 A1 Dec. 23, 2021

Related U.S. Application Data

(63) Continuation of application No. PCT/CN2020/077559, filed on Mar. 3, 2020.

(30) Foreign Application Priority Data

Mar. 4, 2019 (CN) .......................... 201910161416.4

(51) Int. Cl.
*H04W 72/56* (2023.01)
*H04W 72/1268* (2023.01)
*H04W 72/23* (2023.01)
*H04W 72/50* (2023.01)
*H04W 72/566* (2023.01)

(52) U.S. Cl.
CPC ..... *H04W 72/569* (2023.01); *H04W 72/1268* (2013.01); *H04W 72/23* (2023.01); *H04W 72/535* (2023.01)

(58) Field of Classification Search
CPC .......... H04W 72/569; H04W 72/1268; H04W 72/23; H04W 72/535
See application file for complete search history.

(56) References Cited

U.S. PATENT DOCUMENTS

2016/0270116 A1* 9/2016 Lin ....................... H04W 72/23

FOREIGN PATENT DOCUMENTS

| CN | 107889225 A | 4/2018 |
| CN | 108243501 A | 7/2018 |
| CN | 108289065 A | 7/2018 |

(Continued)

OTHER PUBLICATIONS

Notice of Allowance issued in CN201910161416.4, dated Oct. 19, 2022, 4 pages.

(Continued)

*Primary Examiner* — Brenda H Pham

(57) ABSTRACT

A communication method and a communication apparatus are described. A network device explicitly indicates, by using indication information, a transmission priority of data that can be carried on a scheduled transmission resource. After receiving the indication information, a terminal device can determine whether data currently to be sent can be sent on the scheduled transmission resource, to reduce a probability of a communication failure caused by resource preemption in a scenario in which data of at least three transmission priorities coexists. The terminal device may further determine, based on the indication information, whether to-be-received data exists on the scheduled transmission resource.

20 Claims, 5 Drawing Sheets

(56) References Cited

FOREIGN PATENT DOCUMENTS

| CN | 108633088 A | 10/2018 |
|---|---|---|
| CN | 109392148 A | 2/2019 |
| EP | 3780460 A1 | 2/2021 |
| WO | 2018064128 A1 | 4/2018 |
| WO | 2018064360 A1 | 4/2018 |
| WO | 2018165638 A1 | 9/2018 |
| WO | 2019022561 A1 | 1/2019 |

OTHER PUBLICATIONS

Intel Corporation et al.,"Downlink multiplexing of eMBB/URLLC transmissions", 3GPP TSG RAN1 WG Meeting #88, Athens, Greece Feb. 13-17, 2017, R1-1702240, total: 7pages.

Office Action issued in CN201910161416.4, dated May 25, 2022, 7 pages.

Vivo et al.,"UL intra UE Tx prioritization for URLLC", 3GPP TSG RAN WG1 Meeting #94bis Chengdu, China, Oct. 8-12, 2018, R1-1810399, total: 4 pages.

International Search Report and Written Opinion issued in PCT/CN2020/077559, dated May 29, 2020, 10 pages.

Qualcomm Incorporated: "URLLC DL pre-emption and UL suspension indication channel design", 3GPP Draft; R1-1720692, 3rd Generation Partnership Project (3GPP), Mobilecompetence Centre; 650, Route Des Lucioles; F-06921SOPHIA-ANTIPOLIS Cedex; France, vol. RAN WG1, no. Reno, Nevada, US; Nov. 27, 2017-Dec. 1, 2017, 10 pages.

Convida Wireless: "On Intra-UE prioritization", 3GPP Draft; R1-1903157, 3rd Generation Partnership Project(3GPP), Mobile Competence Centre; 650, Route Des Lucioles; F-06921 Sophia-Antipolis Cedex; France, vol. RAN WG1, no. Athens, Greece; Feb. 25, 2019-Mar. 1, 2019, Feb. 16, 2019, 3 pages.

Huawei et al: "Remaining aspects on pre-emption indication for DL multiplexing of URLLC and eMBB", 3GPP Draft; R1-1721452, 3rd Generation Partnership Project (3GPP), Mobilecompetence Centre; 650, Route Des Lucioles; F-06921SOPHIA-ANTIPOLIS Cedex; France, vol. RAN WG1, no. Reno, USA; Nov. 27, 2017-Dec. 1, 2017, Nov. 28, 2017, 11 pages.

Extended European Search Report issued in EP20766017.6, dated Mar. 14, 2022, 14 pages.

Office Action issued in EP20766017.6, dated Jan. 2, 2024, 8 pages.

\* cited by examiner

COMMUNICATION METHOD AND COMMUNICATION APPARATUS

CROSS-REFERENCE TO RELATED APPLICATIONS

This application is a continuation of International Application No. PCT/CN2020/077559, filed on Mar. 3, 2020, which claims priority to Chinese Patent Application No. 201910161416.4, filed on Mar. 4, 2019. The aforementioned disclosures are hereby incorporated by reference in their entities.

TECHNICAL FIELD

This application relates to the communication field, and in particular, to a communication method and a communication apparatus.

BACKGROUND

To cope with explosive growth of mobile data traffic, massive mobile communication device connections, and various emerging new services and application scenarios in the future, a fifth generation (5G) mobile communication system emerges. The 5G mobile communication system needs to support an enhanced mobile broadband (eMBB) service, an ultra-reliable low-latency communication (URLLC) service, and a massive machine-type communications (mMTC) service.

Different services have different requirements on a mobile communication system. For example, typical eMBB services include an ultra-high definition video, augmented reality (AR), and virtual reality (VR). These services are mainly characterized by a large data transmission amount and a quite high transmission rate. Typical URLLC services include tactile interactive applications such as wireless control in an industrial manufacturing or production procedure, motion control and remote repair of an unmanned vehicle and an unmanned aircraft, and remote surgery. These services are mainly characterized by ultra-high reliability, a low latency, a relatively small data transmission amount, and burstiness. In some emergencies, a URLLC service may preempt a transmission resource of an eMBB service.

A method for meeting data transmission requirements of both the URLLC service and the eMBB service is to indicate, by using a preemption notification (PI) or a terminal transmission indication (INT), the preempted resource, so that a communication device that supports the eMBB service adopts a corresponding measure (for example, retransmission) to deal with this situation. However, in the foregoing solution, a device that supports the URLLC service also receives the PI or the INT. When data of three or more transmission priorities exists in the communication system, the device that supports the URLLC service cannot determine whether a resource used by the URLLC service is preempted by another device, and this may result in a communication failure.

SUMMARY

Example embodiments of this application provide a communication method and a communication apparatus. A network device explicitly indicates, by using indication information, a transmission priority of data that can be carried on a scheduled transmission resource, so that a terminal device can determine whether the terminal device can use the scheduled transmission resource, to reduce a probability of a communication failure caused by resource preemption in a scenario in which data of at least three transmission priorities coexists.

According to an embodiment of a first aspect, a communication method is provided. The method includes: receiving a higher layer message, where the higher layer message is used to configure a transmission resource, and the transmission resource is capable of being used to transmit data of at least three transmission priorities; receiving first downlink control information, where the first downlink control information indicates a first transmission resource in the transmission resource; receiving second downlink control information, where the second downlink control information indicates a transmission priority, of the at least three transmission priorities, corresponding to a second transmission resource in the transmission resource; and when to-be-transmitted data is uplink data, determining, based on a transmission priority of the uplink data and the transmission priority indicated by the second downlink control information, whether to send the uplink data on an overlapping resource of the first transmission resource and the second transmission resource; and/or when the to-be-transmitted data is downlink data, determining, based on a transmission priority of the downlink data and the transmission priority indicated by the second downlink control information, whether the downlink data exists on the overlapping resource of the first transmission resource and the second transmission resource.

The second downlink control information explicitly indicates the transmission priority of data that can be carried on the second transmission resource. Compared with a communication method, in a conventional technology, in which only whether the second transmission resource is preempted can be indicated, a terminal device can undoubtedly determine whether to send the uplink data on the overlapping resource; and/or the terminal device can undoubtedly determine whether the downlink data exists on the overlapping resource, to reduce a probability of a communication failure caused by resource preemption in a scenario in which the data of the at least three transmission priorities coexists.

Optionally, the determining, based on a transmission priority of the uplink data and the transmission priority indicated by the second downlink control information, whether to send the uplink data on an overlapping resource of the first transmission resource and the second transmission resource includes: when the transmission priority of the uplink data belongs to the transmission priority indicated by the second downlink control information, determining to send the uplink data on the overlapping resource; or when the transmission priority of the uplink data does not belong to the transmission priority indicated by the second downlink control information, determining not to send the uplink data on the overlapping resource.

When determining that the overlapping resource can be used, the terminal device may choose to send the uplink data on the overlapping resource. When determining that the overlapping resource cannot be used, the terminal device may give up sending the uplink data, or may send the uplink data on another transmission resource (for example, a transmission resource that can be used to transmit the uplink data). Therefore, in the foregoing implementation, mutual interference between data of different transmission priorities when the data of the at least three transmission priorities exists in a communication system can be avoided.

Optionally, the determining, based on a transmission priority of the downlink data and the transmission priority indicated by the second downlink control information, whether the downlink data exists on the overlapping resource of the first transmission resource and the second transmission resource includes: when the transmission priority of the downlink data belongs to the transmission priority indicated by the second downlink control information, determining that the downlink data exists on the overlapping resource; or when the transmission priority of the downlink data does not belong to the transmission priority indicated by the second downlink control information, determining that the downlink data does not exist on the overlapping resource.

When determining that the overlapping resource can carry the downlink data, the terminal device may choose to detect the downlink data on the overlapping resource. When determining that the overlapping resource cannot carry the downlink data, the terminal device may give up detecting the downlink data on the overlapping resource. Therefore, power consumption of the terminal device can be reduced in the foregoing implementation.

Optionally, the method further includes: when the downlink data exists on the overlapping resource, receiving the downlink data on the overlapping resource; or when the downlink data does not exist on the overlapping resource, skipping receiving the downlink data on the overlapping resource.

If the terminal device determines that the downlink data does not exist on the overlapping resource, the terminal device may give up receiving the downlink data, or may receive the downlink data on another transmission resource (for example, a transmission resource that can be used to transmit the downlink data) based on scheduling information of a network device. Therefore, the terminal device may flexibly select a communication mode based on the foregoing solution.

Optionally, the transmission priority indicated by the second downlink control information is only one of the at least three transmission priorities.

Because one piece of second downlink control information only needs to indicate whether data of one transmission priority can be transmitted on the second transmission resource, information indicating the transmission priority in the second downlink control information needs to occupy only one bit, thereby reducing information overheads.

Optionally, the receiving second downlink control information includes: receiving the second downlink control information based on the transmission priority of the uplink data, where the transmission priority indicated by the second downlink control information is the transmission priority of the uplink data; and/or receiving the second downlink control information based on the transmission priority of the downlink data, where the transmission priority indicated by the second downlink control information is the transmission priority of the downlink data.

Alternatively, the terminal device may monitor corresponding second indication information based on a transmission priority of the to-be-transmitted data, thereby reducing a quantity of monitored second indication information.

Optionally, the transmission priority indicated by the second downlink control information is a non-highest priority.

Because data of a highest priority has a highest permission to use a transmission resource, and data of another priority cannot preempt the transmission resource used by the data of the highest priority, the network device may not send second downlink control information indicating the highest priority, that is, the transmission priority indicated by the second downlink control information is the non-highest priority, and a terminal device that sends and/or receives the data of the highest priority does not need to monitor the second downlink control information, to reduce power consumption of the terminal device.

Optionally, the method further includes: receiving third indication information, where the third indication information is used to indicate the transmission priority of the to-be-transmitted data.

The transmission priority of the uplink data and/or the transmission priority of the downlink data may be dynamically determined based on the third indication information, so that the transmission priority of the uplink data and/or the transmission priority of the downlink data can better match an actual situation. For example, when the uplink data fails to be transmitted because of resource preemption for a plurality of times, the network device may increase the transmission priority of the uplink data by using the third indication information. For example, the third indication information may be carried in the downlink control information.

Alternatively, the third indication information may be carried in the higher layer message. When the terminal device supports only one transmission priority among a plurality of transmission priorities, the transmission priority may be directly configured by using the higher layer message, or the transmission priority supported by the terminal device may be implicitly indicated by using the higher layer message indicating a service transmission quality requirement, a transmission channel priority, and the like.

Optionally, when the to-be-transmitted data is to-be-initially-transmitted data, the first downlink control information indicates the transmission priority of the to-be-transmitted data by using a code block group transmission information (CBGTI) field, or the first downlink control information indicates the transmission priority of the to-be-transmitted data by using a combination of a CBGTI field and a code block group flushing out information (CBGFI) field.

CBGTI and CBGFI are meaningless during initial transmission process. Therefore, the CBGTI field and the CBGFI field during the initial transmission process may be used to indicate the transmission priority of the uplink data and/or the transmission priority of the downlink data. In the foregoing solution, an existing field is reused, and a new field does not need to be added, thereby reducing information overheads for indicating the transmission priority of the to-be-transmitted data.

According to an embodiment of a second aspect, this application provides another communication method. The method includes: sending a higher layer message, where the higher layer message is used to configure a transmission resource, and the transmission resource is capable of being used to transmit data of at least three transmission priorities; sending first downlink control information, where the first downlink control information is used to indicate a first transmission resource in the transmission resource; and sending second downlink control information, where the second downlink control information is used to indicate a transmission priority, from the at least three transmission priorities, corresponding to a second transmission resource in the transmission resource.

The second downlink control information explicitly indicates the transmission priority of data that can be carried on the second transmission resource. Compared with a communication method, in a conventional technology, in which only whether a transmission resource is preempted can be indicated, a terminal device can undoubtedly determine whether uplink data can be sent on an overlapping resource of the first transmission resource and the second transmission resource; and/or the terminal device can undoubtedly determine whether downlink data exists on the overlapping resource of the first transmission resource and the second transmission resource, to reduce a probability of a communication failure caused by resource preemption in a scenario in which the data of the at least three transmission priorities coexists.

Optionally, the transmission priority indicated by the second downlink control information is only one of the at least three transmission priorities.

A network device may configure one piece of second downlink control information for data of each transmission priority. In this way, the network device may flexibly configure sending periodicities of the second downlink control information based on different transmission priorities.

Optionally, the transmission priority indicated by the second downlink control information is a non-highest priority.

Because data of a highest priority has a highest permission to use a transmission resource, and data of the non-highest priority cannot preempt the transmission resource used by the data of the highest priority, the network device may not send second downlink control information indicating the highest priority, thereby reducing information overheads of the network device.

Optionally, the method further includes: sending third indication information, where the third indication information is used to indicate a transmission priority of to-be-transmitted data.

A transmission priority of the uplink data and/or a transmission priority of the downlink data may be dynamically determined based on the third indication information, so that the transmission priority of the uplink data and/or the transmission priority of the downlink data can better match an actual situation. For example, when the uplink data fails to be transmitted because of resource preemption for a plurality of times, the network device may increase the transmission priority of the uplink data by using the indication information. For example, the indication information may be carried in the downlink control information. When the terminal device supports only one transmission priority among a plurality of transmission priorities, the transmission priority may be directly configured by using the higher layer message, or the transmission priority supported by the terminal device may be implicitly corresponded to by using another higher layer message (such as a service transmission quality requirement and a transmission channel priority). That is, the third indication information may further be carried in the higher layer message.

Optionally, during initial transmission, the first downlink control information indicates the transmission priority of the to-be-transmitted data by using a CBGTI field, or the first downlink control information indicates the transmission priority of the to-be-transmitted data by using a combination of a CBGTI field and a CBGFI field.

CBGTI and CBGFI are meaningless during initial transmission process. Therefore, the CBGTI field and the CBGFI field during the initial transmission process may be used to indicate the transmission priority of the uplink data and/or the transmission priority of the downlink data. In the foregoing solution, an existing field is reused, and a new field does not need to be added, thereby reducing information overheads for indicating the transmission priority of the to-be-transmitted data.

According to an embodiment of a third aspect, this application provides a communication apparatus. The apparatus may implement functions corresponding to the method involved in the foregoing first aspect, and the functions may be implemented by hardware, or may be implemented by hardware executing corresponding software. The hardware or the software includes one or more units or modules corresponding to the foregoing functions.

In an example embodiment, the apparatus includes a processor. The processor is configured to support the apparatus in performing the method involved in the foregoing first aspect. The apparatus may further include a memory. The memory is configured to be coupled to the processor, and stores a program and data. Optionally, the apparatus further includes a transceiver. The transceiver is configured to support communication between the apparatus and a network device. The transceiver may include an independent receiver and an independent transmitter, or the transceiver may include a circuit integrating a sending function and a receiving function.

According to an embodiment of a fourth aspect, this application provides another communication apparatus. The apparatus may implement functions corresponding to the method involved in the foregoing second aspect, and the functions may be implemented by hardware, or may be implemented by hardware executing corresponding software. The hardware or the software includes one or more units or modules corresponding to the foregoing functions.

In an example embodiment, the apparatus includes a processor. The processor is configured to support the apparatus in performing the method involved in the foregoing second aspect. The apparatus may further include a memory. The memory is configured to be coupled to the processor, and stores a program and data. Optionally, the apparatus further includes a transceiver. The transceiver is configured to support communication between the apparatus and a terminal device. The transceiver may include an independent receiver and an independent transmitter, or the transceiver may include a circuit integrating a sending function and a receiving function.

According to an embodiment of a fifth aspect, this application provides a computer-readable storage medium. The computer-readable storage medium stores a computer program; and when the computer program is executed by a processor, the processor is enabled to perform the method according to the first aspect.

According to an embodiment of a sixth aspect, this application provides a computer-readable storage medium. The computer-readable storage medium stores a computer program; and when the computer program is executed by a processor, the processor is enabled to perform the method according to the second aspect.

According to an embodiment of a seventh aspect, this application provides a computer program product. The computer program product includes computer program code; and when the computer program code is run by a processor, the processor is enabled to perform the method according to the first aspect.

According to an embodiment of an eighth aspect, this application provides a computer program product. The computer program product includes computer program code; and when the computer program code is run by a processor, the processor is enabled to perform the method according to the second aspect.

BRIEF DESCRIPTION OF DRAWINGS

The following detailed description of exemplary non-limiting illustrative embodiments is to be read in conjunction with the drawings of which.

DESCRIPTION OF EMBODIMENTS

Figure 1:
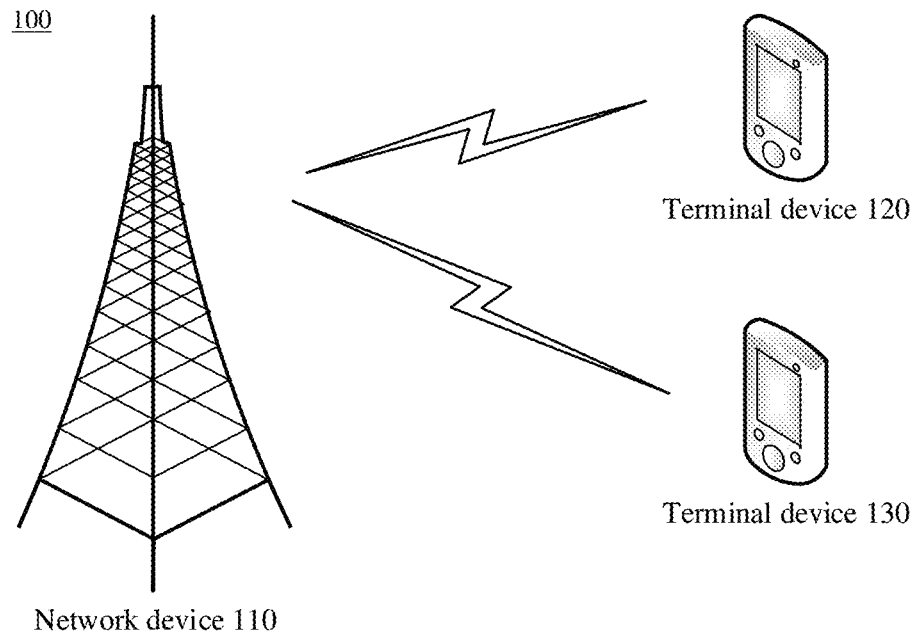
FIG. 1 is a schematic diagram of an exemplary communication system applicable to embodiments of this application.

An example application scenario of this application is first described. FIG. 1 is a schematic diagram of an exemplary communication system applicable to this application.

The communication system 100 includes a network device 110, a terminal device 120, and a terminal device 130. The terminal device 120 communicates with the network device 110 by using an electromagnetic wave, the terminal device 130 communicates with the network device 110 by using an electromagnetic wave, and the terminal device 120 may also communicate with the terminal device 130 by using an electromagnetic wave.

In this embodiment, the terminal device 120 and the terminal device 130 may include various handheld devices, vehicle-mounted devices, wearable devices, or computing devices that have a wireless communication function, or other processing devices connected to a wireless modem, for example, user equipment (UE) defined by the $3^{rd}$ generation partnership project (3GPP), a mobile station (MS), a soft terminal, a home gateway, or a set-top box. A chip used in the foregoing device may also be referred to as a terminal device.

The network device 110 may be a base station defined by 3GPP, for example, a base station (e.g., gNB) in a 5G communication system. The network device 110 may alternatively be a non-3GPP access network device, for example, an access gateway (AGF). Alternatively, the network device may be a relay station, an access point, a vehicle-mounted device, a wearable device, or a device of another type.

The terminal device 120 and the terminal device 130 may transmit data of a same type, or may transmit data of different types. When the terminal device 120 and the terminal device 130 transmit the data of the different types, in an optional example, the terminal device 120 transmits a data packet of an eMBB service (referred to as "eMBB data" for short), and the terminal device 130 transmits a data packet of a URLLC service (referred to as "URLLC data" for short).

Because the eMBB service has a relatively large amount of data and has a relatively high requirement for a transmission rate, data transmission is usually performed by using a relatively long scheduling time unit to improve transmission efficiency. For example, the transmission is performed by using a slot with a subcarrier spacing of 15 kHz. A time length of the slot is 1 ms, and corresponds to 14 time domain symbols. The URLLC data is usually transmitted by using a relatively short scheduling time unit, to meet a requirement of the URLLC service for an ultra-short latency. For example, the URLLC data is transmitted by using a slot with a subcarrier spacing of 60 kHz. A time length of the slot is 0.25 ms, and corresponds to 14 time domain symbols.

A data packet of the URLLC service is generated unexpectedly and randomly. No data packet may be generated in a very long period of time, or a plurality of data packets may be generated in a very short period of time. In most cases, the data packet of the URLLC service is a small packet, for example, includes 50 bytes. A feature of the data packet of the URLLC service affects an allocation manner of transmission resources of the communication system. The transmission resources herein include but are not limited to a frequency domain resource, a time domain resource, a code domain resource, and a space domain resource (for example, an angle of arrival of a signal received, an angle of departure of a signal, or a phase of a signal). Usually, the transmission resources are allocated by the network device 110. If the network device 110 allocates a resource to the URLLC service in a manner of reserving the resource, the transmission resource is in an idle state when there is no URLLC service. Therefore, a waste of the transmission resource is caused. In addition, a short-latency feature of the URLLC service requires that a data packet be transmitted within a short period of time (for example, a latency is less than 0.5 ms). Therefore, the network device 110 needs to reserve sufficient bandwidth for the URLLC service, which causes a sharp decrease in transmission resource utilization of the communication system 100.

Figure 2:
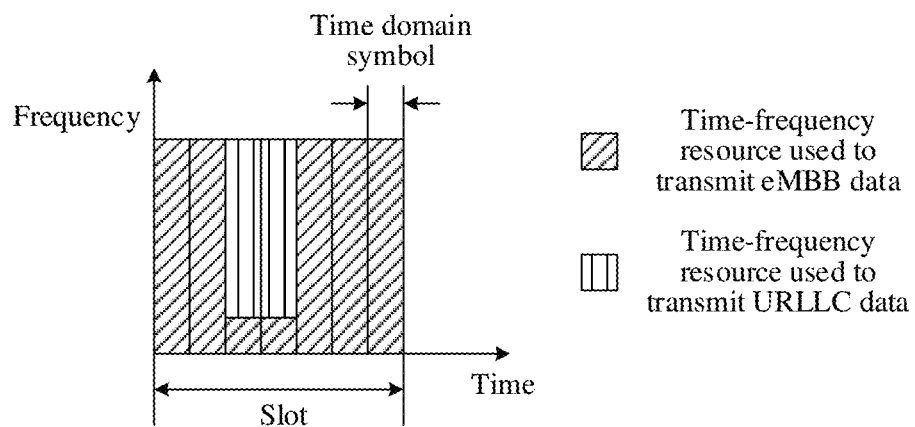
FIG. 2 is a schematic diagram of an exemplary resource preemption scenario.

To improve the transmission resource utilization, the network device 110 usually does not reserve a resource for downlink transmission of the URLLC service. To meet the ultra-short-latency requirement of the URLLC service, when the URLLC data arrives at the network device 110, if there is no idle transmission resource at this moment, the network device 110 cannot schedule the URLLC data after waiting for transmission of eMBB data that currently occupies a transmission resource to be completed. The network device 110 may allocate a resource to the URLLC data in a preemption manner. As shown in FIG. 2, preemption herein means that the network device 110 selects a part or all of an allocated time-frequency resource used to transmit the eMBB data, for transmitting the URLLC data, and the network device 110 does not send the eMBB data on the time-frequency resource used to transmit the URLLC data.

Preemption of a transmission resource of the eMBB data by the URLLC data seriously deteriorates quality of service of an eMBB user (for example, the terminal device 120). Therefore, how to reduce impact of the preemption on the eMBB user needs to be considered. One solution is to send additional indication information to notify the eMBB user of the resource that is preempted, so that the eMBB user may clear, from a buffer during decoding, data that is received from the preempted resource and that does not belong to the eMBB user, to reduce interference caused by the URLLC data in the decoding.

The foregoing briefly describes a resource preemption scenario by using transmission of data of two transmission priorities as an example. If data of three or more transmission priorities exists in the resource preemption scenario, the terminal device may fail to determine whether a resource allocated to the terminal device is preempted by data with a higher priority, or the terminal device may fail to determine whether to-be-received data exists on a scheduled resource. In view of this, embodiments of this application provides a communication method 300. The communication method 300 may be applied to the communication system shown in FIG. 1. For example, the method may be performed by the terminal device 120 or the terminal device 130, or may be performed by a chip in the terminal device 120 or a chip in the terminal device 130. For brevity, the following "terminal device" and "network device" are not attached with reference signs.

Figure 3:
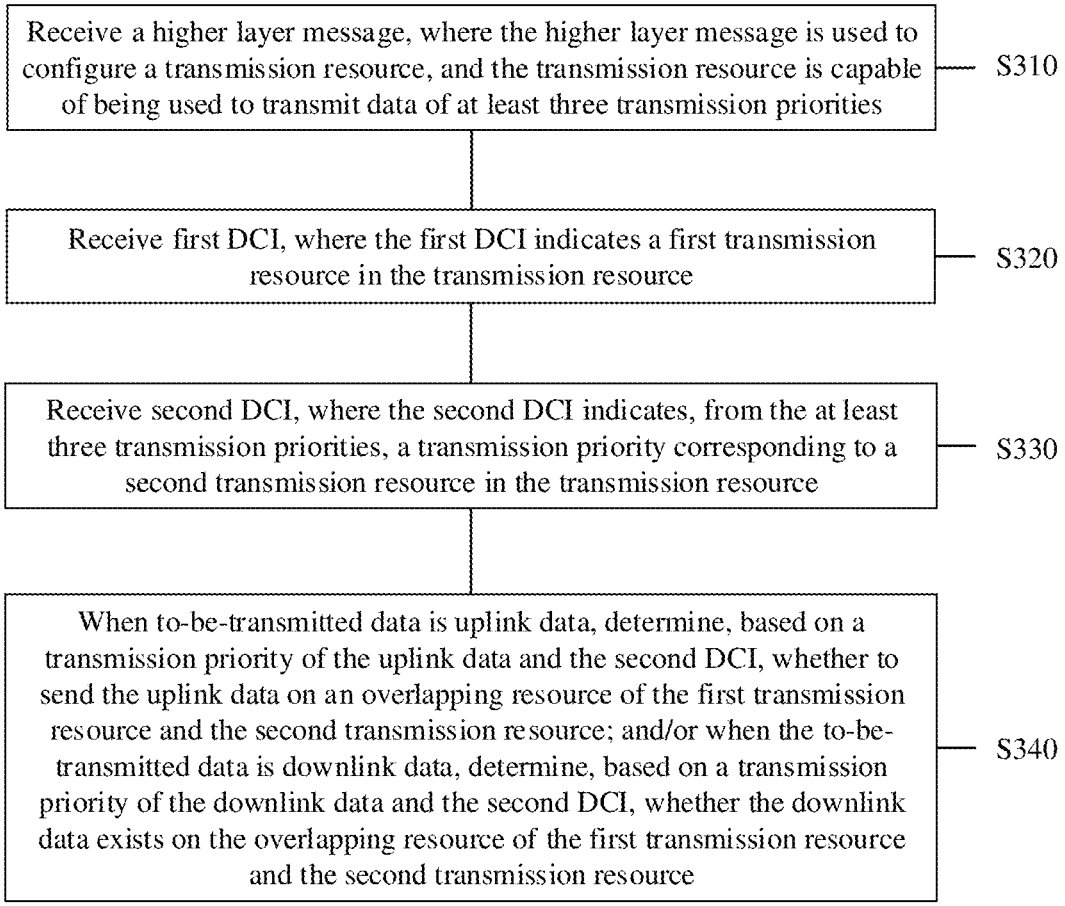
FIG. 3 is a schematic diagram of a communication method according to an embodiment of this application.

As shown in FIG. 3, a communication method 300 includes the following steps.

S310: Receive a higher layer message, where the higher layer message is used to configure a transmission resource, and the transmission resource is capable of being used to transmit data of at least three transmission priorities.

The higher layer message may be, for example, a radio resource control (RRC) message or a media access control (MAC) layer message. A network device may send the higher layer message by using a downlink channel. The downlink channel may be a physical downlink shared channel (PDSCH), or may be another type of downlink channel. How the network device sends the higher layer message is not limited in embodiments of this application.

The transmission resource configured by using the higher layer message may be divided into a plurality of sub-resources. For example, the transmission resource includes a first transmission resource and a second transmission resource, and the first transmission resource and the second transmission resource may partially overlap, may completely overlap, or may not overlap.

Transmission priorities of data that can be transmitted on the first transmission resource and the second transmission resource may be the same or different. The first transmission resource may be used to transmit data of one transmission priority, or may be used to transmit data of two or more transmission priorities. The second transmission resource may be used to transmit data of one transmission priority, or may be used to transmit data of two or more transmission priorities.

The network device may indicate, by using indication information, a transmission priority of data that can be transmitted on each resource. For example, the network device may send first indication information to a terminal device, where the first indication information indicates a transmission priority corresponding to the first transmission resource. The first indication information may be a field in the higher layer message, or may be an independent message.

Optionally, because different types of data usually have different transmission priorities, "transmission priority" in certain embodiments of this application may also be replaced with "type". Data types mainly include eMBB data and URLLC data. A transmission priority of the URLLC data is higher than that of the eMBB data. The "transmission priority" may further be classified based on urgency of data. For example, for the URLLC data, a transmission priority of URLLC data with higher urgency is higher than that of URLLC data with lower urgency. The transmission priority may be interpreted as a sequence of using the transmission resource. High-priority data can preferably use the transmission resource. The high-priority data may preempt a transmission resource already allocated to low-priority data, but the low-priority data cannot preempt a transmission resource already allocated to the high-priority data.

Optionally, the transmission priority may be specifically a physical channel priority at a physical layer, and indicates a sequence of preferably occupying a physical resource. The physical channel priority may be indicated by using at least one bit of DCI. The transmission priority may be specifically a logical channel priority (LCP) at a MAC layer, where the logical channel priority may have a correspondence with the physical channel priority.

Optionally, the transmission priority may be identified by using a radio network temporary identifier (RNTI) that is used to scramble the DCI and that is specific to the transmission priority. For example, DCI received by the terminal device by using a URLLC-RNTI indicates that the DCI is used to schedule URLLC data of a higher priority. DCI received by the terminal side device by using an eMBB-RNTI indicates that the DCI is used to schedule eMBB data of a lower priority.

Optionally, the transmission priority may alternatively be identified by using a DCI transmission format specific to the transmission priority.

Optionally, the transmission priority may alternatively be identified by using a data transmission mode, a data transmission length, or a modulation and coding scheme used for data transmission. For example, the data transmission mode may be a type A or a type B defined in an existing NR system. The type A indicates that transmission of a PUSCH or a PDSCH that carries data always starts from the first three time domain symbols in a slot, and the type B indicates that transmission of the PUSCH or the PDSCH may start from any symbol in a slot. If the transmission mode is the type A, it indicates that a data transmission priority is higher (applicable to the URLLC data). If the transmission mode is the type B, it indicates that a data transmission priority is lower (applicable to the eMBB data).

Optionally, the transmission priority may alternatively be identified by using a transmission time length of data transmission. Shorter duration of a PDSCH or a PUSCH that carries data (a quantity of time domain symbols occupied by the PDSCH/PUSCH) indicates a higher transmission priority (applicable to the URLLC data).

Optionally, the transmission priority may alternatively be identified by using the modulation and coding scheme used for data transmission. If a modulation and coding scheme used for transmission of a PDSCH or a PUSCH that carries data is a lower code rate, the transmission priority is higher (applicable to the URLLC data); and if the adjustment coding scheme is a higher code rate, the transmission priority is lower (applicable to the eMBB data).

The terminal device may determine a transmission priority of current data based on one or a combination of a physical channel priority of the data, a logical channel priority of the data, an RNTI for scrambling DCI, a DCI transmission format, a data transmission mode, a data transmission length, or a modulation and coding scheme used for data transmission.

For example, the transmission resource can carry data of three transmission priorities. The data of the three transmission priorities may be the eMBB data, first URLLC data, and second URLLC data. The eMBB data has a lowest transmission priority, and the second URLLC data has a highest transmission priority. A transmission priority of the first URLLC data is between the transmission priority of the eMBB data and the transmission priority of the second URLLC data.

If the terminal device has to-be-sent data or to-be-received data, the terminal device may determine, based on the following steps, the first transmission resource used to send the data and/or receive the data.

S320: Receive first downlink control information (DCI), where the first DCI indicates the first transmission resource in the transmission resource.

The first transmission resource is used to transmit to-be-transmitted data. The to-be-transmitted data may be uplink data or downlink data. A transmission priority of the to-be-transmitted data may be indicated by the network device by using the higher layer message, or may be indicated by the network device by using the first DCI.

The network device may send the first DCI by using a physical downlink control channel (PDCCH), or may send the first DCI by using another downlink channel.

The terminal device may start to detect second DCI after receiving the first DCI, to determine whether the first transmission resource can carry the to-be-transmitted data. That is, S330 is performed.

S330: Receive the second DCI, where the second DCI indicates a transmission priority, of the at least three transmission priorities, corresponding to the second transmission resource in the transmission resource.

The second DCI is used to indicate the transmission priority corresponding to the second transmission resource. If the terminal device does not receive the second DCI, the terminal device may continue to send the to-be-sent data and/or receive the to-be-received data. Whether the terminal device sends data in a process of detecting the second DCI is not limited in embodiments of this application, and whether the terminal device receives (or "detects") data in the process of detecting the second DCI is not limited in embodiments of this application either.

Alternatively, the terminal device may detect the second DCI based on a sending periodicity that is of the second DCI and that is configured by the network device, without considering whether the first DCI is received or whether the first DCI is successfully decoded. Compared with a solution in which detection of the second DCI begins after the first DCI is received, this solution slightly increases power consumption of the terminal device, but it can be ensured that the second DCI is received in a timely manner, to avoid a case in which transmission of high-priority data fails due to preemption of a transmission resource of the high-priority data.

The second DCI may indicate, by using independent indication information, the transmission priority corresponding to the second transmission resource, for example, indicate different transmission priorities by using different values of two bits. The second DCI may alternatively be a specific state of other information, and for example, a one-bit state is distinguished by using different radio network temporary identifiers (RNTI) or different search space (SS). The one-bit state is used to indicate a transmission priority of data that can be carried by the second transmission resource.

In addition, the transmission priority indicated by the second DCI may be the same as the transmission priority of the to-be-transmitted data, or may be different from the transmission priority of the to-be-transmitted data.

For example, if the to-be-transmitted data is the eMBB, the transmission priority indicated by the second DCI may be the transmission priority corresponding to the eMBB, or may be the transmission priority corresponding to the first URLLC, or may be the transmission priorities corresponding to the first URLLC and the second URLLC, or may be the transmission priorities corresponding to the eMBB, the first URLLC, and the second URLLC.

For another example, if the to-be-transmitted data is the first URLLC and the second URLLC, the transmission priority indicated by the second DCI may be the transmission priority corresponding to the first URLLC, or may be the transmission priorities corresponding to the first URLLC and the second URLLC.

Information (that is, second indication information) that indicates the transmission priority and that is in the second DCI may have different forms. The following uses examples to describe possible forms of the second indication information. However, the following examples should not be construed as a limitation on the second indication information.

A possible form of the second indication information is as follows:

There is data (or services) of four transmission priorities in a communication system, and as sorted in descending order of the transmission priorities, the four transmission priorities are a transmission priority 1, a transmission priority 2, a transmission priority 3, and a transmission priority 4. The network device may use two bits as the second indication information to indicate a transmission priority of data that cannot be carried on the second transmission resource. A correspondence between a value of the two bits and an indicated transmission priority is listed in Table 1.

TABLE 1

| Value of two bits | Transmission priority |
|---|---|
| 00 | Transmission priority 2 |
| 01 | Transmission priority 3 |
| 10 | Transmission priority 4 |
| 11 | Transmission of a service with a lowest transmission priority is allowed. |

When the value of the two bits is "00", the second indication information indicates that the second transmission resource cannot carry data of the transmission priority 2, data of the transmission priority 3, and data of the transmission priority 4. That is, the transmission priority of the data carried on the second transmission resource cannot be equal to or lower than the transmission priority 2.

When the value of the two bits is "01", the second indication information indicates that the second transmission resource cannot carry data of the transmission priority 3 and data of the transmission priority 4. That is, the transmission priority of the data carried on the second transmission resource cannot be equal to or lower than the transmission priority 3.

When the value of the two bits is "10", the second indication information indicates that the second transmission resource cannot carry data of the transmission priority 4. That is, the transmission priority of the data carried on the second transmission resource cannot be equal to or lower than the transmission priority 4.

When the value of the two bits is "11", the second indication information indicates that the transmission priority of the data that cannot be carried on the second transmission resource does not exist. That is, the second transmission resource can carry data of any transmission priority including the lowest transmission priority.

When data of the transmission priority 1 exists, the data of the transmission priority 1 definitely preempts a transmission resource of data of another transmission priority. Therefore, whether data of a highest transmission priority can be sent does not need to be indicated by the second indication information.

Another possible form of the second indication information is as follows:

There is data (or "services") of four transmission priorities in a communication system, and as sorted in descending order of the transmission priorities, the four transmission priorities are a transmission priority 1, a transmission priority 2, a transmission priority 3, and a transmission priority 4. The network device may use two bits as the second indication information to indicate a transmission priority of data that can be carried on the second transmission resource. A correspondence between a value of the two bits and an indicated transmission priority is listed in Table 2.

TABLE 2

| Value of two bits | Transmission priority |
| --- | --- |
| 00 | Transmission priority 1 |
| 01 | Transmission priority 2 |
| 10 | Transmission priority 3 |
| 11 | Transmission priority 4 |

When the value of the two bits is "00", the second indication information indicates that a lowest transmission priority of data that can be carried on the second transmission resource is the transmission priority 1. That is, the transmission priority of the data carried on the second transmission resource needs to be greater than or equal to the transmission priority 1.

When the value of the two bits is "01", the second indication information indicates that a lowest transmission priority of data that can be carried on the second transmission resource is the transmission priority 2. That is, the transmission priority of the data carried on the second transmission resource needs to be greater than or equal to the transmission priority 2.

When the value of the two bits is "10", the second indication information indicates that a lowest transmission priority of data that can be carried on the second transmission resource is the transmission priority 3. That is, the transmission priority of the data carried on the second transmission resource needs to be greater than or equal to the transmission priority 3.

When the value of the two bits is "11", the second indication information indicates that a lowest transmission priority of data that can be carried on the second transmission resource is the transmission priority 4. That is, the transmission priority of the data carried on the second transmission resource needs to be greater than or equal to the transmission priority 4, or the transmission resource can carry data of a lowest transmission priority.

It can be learned from Table 1 and Table 2 that the second indication information of different forms has a same effect, and both can indicate whether data with a transmission priority can be transmitted on the second transmission resource.

The foregoing second indication information can indicate data of at least one transmission priority that can be carried by the second transmission resource (that is, at least one transmission priority corresponding to the second transmission resource). Embodiments of this application further provide another type of second indication information. The second indication information can indicate only one transmission priority, and a network may send a plurality of pieces of second indication information corresponding to different transmission priorities. The terminal device determines, based on a transmission priority of the to-be-sent data, second indication information that needs to be monitored.

For example, if the transmission priority of the to-be-sent data on the first transmission resource is the transmission priority 3, the terminal device may monitor only second indication information corresponding to the transmission priority 3. If the terminal device receives the second indication information corresponding to the transmission priority 3, the terminal device determines that data of a higher transmission priority exists on the second transmission resource. If the terminal device does not receive the second indication information corresponding to the transmission priority 3, the terminal device determines that data of a higher transmission priority does not exist on the second transmission resource.

Similarly, the terminal device may alternatively determine, based on a transmission priority of the to-be-received data, second indication information that needs to be monitored.

The network device may configure different sending periodicities for different second indication information based on a service feature, so that the second indication information can be sent more flexibly.

For example, an eMBB service usually occupies a larger resource, and the network device may configure a longer sending periodicity for second indication information corresponding to the eMBB service. A URLLC service usually occupies a smaller resource, and the network device may configure a shorter sending periodicity for second indication information corresponding to the URLLC service.

Because one piece of second indication information needs to indicate only one transmission priority, the second indication information may be represented by one bit, and a value of the bit indicates whether the second transmission resource can carry data of a transmission priority. The network device and the terminal device may distinguish different second indication information by using RNTIs or SS. Therefore, this solution reduces a data amount of the second indication information.

In addition, because data of a highest priority has a highest level to use a transmission resource, and data of another transmission priority cannot preempt the transmission resource used by the data of the highest priority, the network device may not send second indication information indicating the highest priority, that is, the transmission priority indicated by the second indication information is a non-highest priority, and the terminal device that sends and/or receives the data of the highest transmission priority does not need to monitor the second indication information. This reduces power consumption of the terminal device.

The foregoing scenarios are all scenarios of one transmission resource. Alternatively, the network device may divide one transmission resource into a plurality of sub-resources, and use the second indication information to indicate a transmission priority of data that can be carried by each sub-resource.

Figure 4:
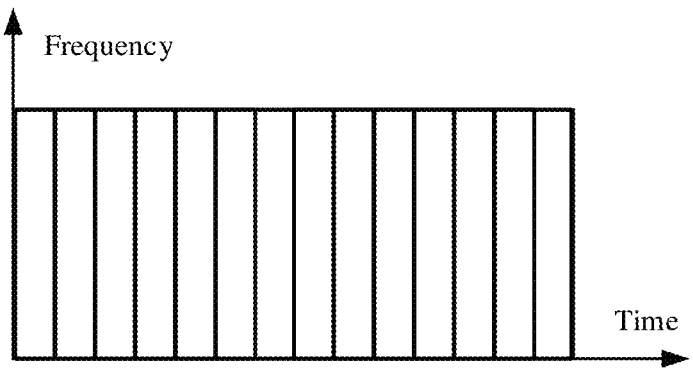
FIG. 4 is a schematic diagram of an exemplary downlink reference resource division manner.
Figure 5:
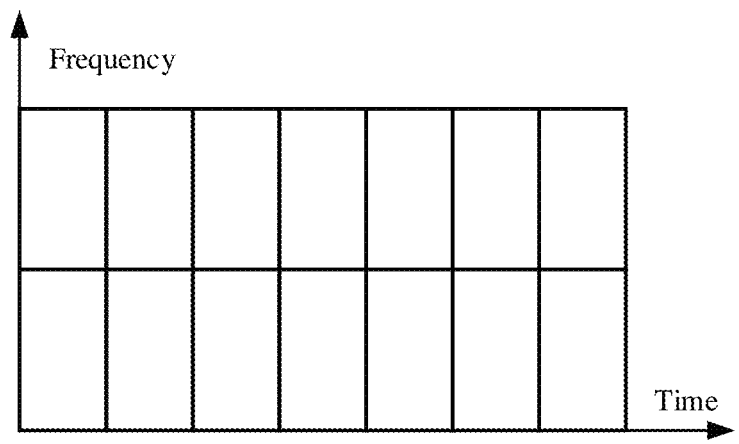
FIG. 5 is a schematic diagram of another exemplary downlink reference resource division manner.

For example, the eMBB data and the URLLC data may be transmitted by using a downlink reference resource (Reference Downlink Resource, RDR). The network device may configure a time domain range and a frequency domain range of the RDR, and configure a division manner of the RDR. FIG. 4 and FIG. 5 respectively show two non-limiting exemplary RDR division manners.

In FIG. 4, the RDR is divided into 14 parts in time domain, and is not divided in frequency domain. In this case, the RDR is divided into 14 sub-resources. The network device may send second indication information including 28 bits. Every two bits in the 28 bits indicate a transmission priority of data that can be carried by one sub-resource. The first transmission resource may be a part or all of the 14 sub-resources, and the second transmission resource may also be a part or all of the 14 sub-resources.

In FIG. 5, the RDR is divided into seven parts in time domain, and is divided into two parts in frequency domain. In this case, the RDR is divided into 14 sub-resources. The network device may send second indication information including 28 bits. Every two bits in the 28 bits indicate a transmission priority of data that can be carried by one sub-resource. The first transmission resource may be a part or all of the 28 sub-resources, and the second transmission resource may also be a part or all of the 28 sub-resources.

After the terminal device receives the second indication information, if an overlapping resource exists between the first transmission resource and the second transmission resource, the terminal device may perform S340.

S340: When the to-be-transmitted data is the uplink data, determine, based on a transmission priority of the uplink data and the second DCI, whether to send the uplink data on the overlapping resource of the first transmission resource and the second transmission resource; and/or when the to-be-transmitted data is the downlink data, determine, based on a transmission priority of the downlink data and the second DCI, whether the downlink data exists on the overlapping resource of the first transmission resource and the second transmission resource.

The terminal device may be only in a sending state, that is, the terminal device is ready to send uplink data of a first transmission priority or is sending uplink data of a first transmission priority. Alternatively, the terminal device may be only in a receiving state, that is, the terminal device is ready to detect downlink data of a first transmission priority or is detecting downlink data of a first transmission priority. Alternatively, the terminal device may be in a sending state and a receiving state at the same time, that is, the terminal device is ready to send uplink data of a first transmission priority or is sending uplink data of a first transmission priority, and the terminal device is ready to detect downlink data of a first transmission priority or is detecting downlink data of a first transmission priority.

The foregoing "determining whether the downlink data exists on the overlapping resource" may be interpreted as that the terminal device determines whether a wireless communication device that sends the "downlink data" sends the "downlink data" on the overlapping resource.

Compared with a communication method, in a conventional technology, in which only whether a transmission resource is preempted can be indicated, the method 300 can be used to explicitly indicate transmission priorities corresponding to data that can use a scheduled or configured transmission resource, so that the terminal device applying the method 300 may explicitly know whether to send the to-be-sent data on the transmission resource, and/or the terminal device applying the method 300 may explicitly know whether the to-be-received data exists. Therefore, a problem of how to perform communication in a communication scenario in which three or more services coexist is resolved.

In an optional implementation, S340 may include the following steps:

when the transmission priority of the uplink data belongs to the transmission priority indicated by the second DCI, sending the uplink data on the overlapping resource; or when the transmission priority of the uplink data does not belong to the transmission priority indicated by the second DCI, skipping sending the uplink data on the overlapping resource.

If the first transmission resource and the second transmission resource completely overlap, and a transmission priority of the uplink data on the first transmission resource is lower than the transmission priority corresponding to the second transmission resource, the terminal device stops sending the uplink data. If the first transmission resource and the second transmission resource partially overlap, and a transmission priority of the uplink data on the first transmission resource is lower than the transmission priority corresponding to the second transmission resource, the terminal device may stop sending the uplink data on a part of the overlapping resource, and continue to send or stop sending the uplink data on a part of a non-overlapping resource. If a transmission priority of the uplink data on the first transmission resource is higher than or equal to the transmission priority corresponding to the second transmission resource, the terminal device may continue to send the uplink data regardless of an overlapping condition between the first transmission resource and the second transmission resource.

For example, the transmission priority of the uplink data is the first transmission priority, and the transmission priorities that are of the data that can be carried by the second transmission resource and that are indicated by the second indication information are the first transmission priority and a second transmission priority. The transmission priority of the uplink data belongs to the transmission priorities indicated by the second indication information. Therefore, the terminal device may send the uplink data on the overlapping resource.

For another example, the transmission priority of the uplink data is the first transmission priority, and the transmission priority that is of the data that can be carried by the second transmission resource and that is indicated by the second indication information is a second transmission priority. The transmission priority of the uplink data does not belong to the transmission priority indicated by the second indication information. Therefore, the terminal device may skip sending the uplink data on the overlapping resource.

There may be two explanations for "skipping sending the uplink data on the overlapping resource": One is that the terminal device has not sent the uplink data, and does not send the uplink data on the overlapping resource based on the second indication information; and the other is that the terminal device is sending the uplink data, and the terminal device stops sending the to-be-sent data on the overlapping resource based on the second indication information.

After the terminal device skips sending the to-be-sent data on the overlapping resource, the terminal device may give up sending the to-be-sent data, or may send the uplink data on another transmission resource (for example, a transmission resource that can be used to transmit the uplink data).

Therefore, in the foregoing implementation, transmission requirements of data of different transmission priorities can be met when the data of the at least three transmission priorities exists in the communication system, and mutual interference between the data of the different transmission priorities is avoided.

In another optional implementation, S340 may further include the following steps:

when the transmission priority of the downlink data belongs to the transmission priority indicated by the second DCI, determining that the downlink data exists on the overlapping resource; or when the transmission priority of the downlink data does not belong to the transmission priority indicated by the second DCI, determining that the downlink data does not exist on the overlapping resource.

For example, the transmission priority of the downlink data is the first transmission priority, and transmission priorities that are of the data that can be carried by the second transmission resource and that are indicated by the second indication information are the first transmission priority and a second transmission priority. The transmission priority of the downlink data belongs to the transmission priorities indicated by the second indication information. Therefore, the terminal device determines that the downlink data exists on the overlapping resource.

For another example, the transmission priority of the downlink data is the first transmission priority, and the transmission priority that is of the data that can be carried by the second transmission resource and that is indicated by the second indication information is a second transmission priority. The transmission priority of the downlink data does not belong to the transmission priority indicated by the second indication information. Therefore, the terminal device determines that the downlink data does not exist on the overlapping resource.

When determining that the downlink data exists on the overlapping resource, the terminal device may choose to detect the downlink data on the overlapping resource. When determining that the downlink data does not exist on the overlapping resource, the terminal device may give up detecting the downlink data on the overlapping resource. Therefore, power consumption of the terminal device can be reduced in the foregoing implementation.

If the terminal device does not receive the downlink data on the overlapping resource, the terminal device may give up receiving the downlink data, or may receive the downlink data on another transmission resource (for example, a transmission resource that can be used to transmit the downlink data) based on scheduling information of the network device. Therefore, the terminal device may flexibly select a communication mode based on the foregoing solution.

The foregoing describes the communication method that is based on the transmission priority of the to-be-transmitted data. The terminal device may determine the transmission priority of the to-be-transmitted data based on an indication of the network device, that is, the network device may send third indication information to the terminal device, where the third indication information is used to indicate the transmission priority of the to-be-transmitted data.

The third indication information may be a service class indication field in the higher layer message, or may be a field in the first DCI. A specific form and a sending manner of the third indication information are not limited in embodiments of this application.

In an optional example, the third indication information may be code block group transmission information (CBGTI), or may be CBGTI and code block group flushing out information (CBGFI). That is, a CBGTI field (that is, a bit corresponding to the CBGTI) may be used to indicate the transmission priority of the to-be-transmitted data, or a CBGTI field and a CBGFI field (that is, a bit corresponding to the CBGFI) may be used together to indicate the transmission priority of the to-be-transmitted data.

The following describes in detail a principle and beneficial effects of indicating the transmission priority by using the CBGTI field and the CBGFI field.

In a new radio (NR) system, because a transport block (TB) is usually relatively large, a network device needs to divide the TB into a plurality of code blocks (CB), encode the CBs, and send the encoded CBs to a terminal device. The terminal device decodes each received CB. When a decoding error of a CB occurs, the terminal device sends a negative acknowledgment (NACK) to the network device, to request the network device to retransmit data of the TB.

To improve system efficiency and increase a network capacity, in the NR system, the CB is further divided into several code block groups (CBG). The terminal device may indicate, to the network device, CBGs on which decoding errors occur, to enable the network device to retransmit only the CBGs on which the decoding errors occur, thereby improving retransmission efficiency. The network device configures a quantity P of CBGs for the terminal device, and the terminal device divides the TB into P CBGs based on the quantity P of CBGs.

If a CBG transmission is configured for the terminal device, a physical layer indicator for scheduling data transmission includes a CBGTI field (P bits in total), and the CBGTI field is used to indicate CBGs that are currently transmitted. During an initial transmission, because all the CBGs included in the TB are transmitted, the CBGTI field has no substantial effect. However, during a retransmission, the P bits of the CBGTI field are in a one-to-one correspondence with the P CBGs. When a bit is set to "1", it indicates that the CBG is transmitted this time, and when the bit is set to "0", it indicates that the CBG is not transmitted this time.

In a conventional communication system, a receiving error of eMBB data occurs due to channel fading, interference, noise, and the like. In this case, a network device may retransmit a TB of the eMBB data, and an eMBB user (that is, "a terminal device that receives the eMBB data") may combine and decode different TBs of the same eMBB data that are transmitted twice or more times. A larger quantity of retransmissions indicates a higher probability of successful decoding by the terminal device. However, when a transmission resource of the eMBB data is preempted by URLLC data, transmission errors may occur on some or all CBGs of the eMBB data. If the eMBB user does not receive a downlink preemption indication, or an error occurs in a receiving process of the downlink preemption indication, the eMBB user cannot determine that receiving errors of the CBGs of the eMBB data are caused by preemption of the URLLC data. After receiving retransmitted data, the eMBB user combines and decodes, in a conventional manner, the retransmitted data together with previously received data. In this case, the URLLC data and the eMBB data are actually combined and decoded, which cannot improve the probability of successful decoding, but may introduce more interference.

Therefore, for downlink data transmission, in addition to the CBGTI field, the CBGFI field is further introduced in the NR system. The CBGFI field has only one bit, and is used to indicate whether a decoding buffer corresponding to a currently transmitted CBG needs to be cleared first before the currently received CBG is put into the buffer. If a current CBG transmission is an initial transmission, it is considered by default that information in a previous TB is cleared from the decoding buffer. Therefore, the CBGFI field during the initial transmission is also useless.

In conclusion, the CBGTI field and the CBGFI field have the following features:

The CBGTI field may be applied to uplink data transmission and the downlink data transmission, and the CBGFI field exists only in the downlink data transmission.

The CBGTI field and CBGFI field are actually useless during an initial transmission. However, to ensure that DCI sizes are the same, in an R15 version of an NR protocol, once the two fields are configured, initially transmitted DCI carries the two fields.

A size of the CBGTI field is two bits, four bits, six bits, or eight bits. If the CBGTI field is configured in the communication system, at least two bits may be used, and the network device may use the two bits to indicate four transmission priorities during the initial transmission. If the CBGTI field and the CBGFI field are configured in the communication system, a maximum of nine bits may be used, and the network device may use the nine bits to indicate 512 transmission priorities during the initial transmission.

When a quantity of transmission priorities that can be represented is greater than or equal to a quantity of actual transmission priorities, for example, a two-bit CBGTI field is configured in the communication system, but data of only three transmission priorities exists in the communication system, a relationship between a value of a bit and a transmission priority may be preset in a protocol. The correspondence may also be configured by a network. A redundant bit may be set to a fixed preset value during the initial transmission (that is, a meaning of the preset value is known by both receiving and sending parties), so that the terminal device correctly receives the third indication information.

When a quantity of transmission priorities that can be represented is less than a quantity of actual transmission priorities, for example, a two-bit CBGTI field is configured in the communication system, but data of five transmission priorities exists in the communication system, the network device may configure one additional bit, so that three bits are used to indicate the five transmission priorities. The additional bit may be set to a fixed preset value during a retransmission (that is, the network device and the terminal device know a meaning of the preset value), to avoid impact on the retransmission.

During the retransmission, because the terminal device already knows the transmission priority of the to-be-sent data and the transmission priority of the to-be-received data, the CBGTI field is used to indicate CBGs that are currently retransmitted, and the CBGFI field is used to indicate whether decoding buffers corresponding to the currently retransmitted CBGs need to be cleared first.

Because the third indication information reuses an existing field, information overheads are reduced in the foregoing solution.

In addition to the CBGTI field and the CBGFI field, an RNTI, an SS configuration, or a control resource set (CORE-SET) configuration may be further used to indicate the transmission priority of the to-be-sent data and the transmission priority of the to-be-received data.

The foregoing mainly describes non-liming, exemplary communication methods described in this application from a perspective of the terminal device. There is a correspondence between a processing process of the network device and that of the terminal device. For example, that the terminal device receives information from the network device means that the network device sends the information, and that the terminal device sends information to the network device means that the network device receives the information from the terminal device. Therefore, even if the processing process of the network device is not clearly described in some parts above, a person of ordinary skill in the art may clearly understand the processing process of the network device based on the processing process of the terminal device.

The foregoing describes in detail examples of the communication method according to this application. The following describes in detail a non-limiting, exemplary communication apparatus for implementing the foregoing communication methods described in this application. It may be understood that, to implement the foregoing functions in the foregoing communication methods, the communication apparatus includes corresponding hardware structures and/or software modules for performing the functions. A person of ordinary skill in the art should easily be aware that, in combination with units and algorithm steps of the examples described in the embodiments disclosed in this specification, embodiments of this application may be implemented by hardware or a combination of hardware and computer software. Whether a function is performed by hardware or hardware driven by computer software depends on particular applications and design constraints of the technical solutions. A person of ordinary skill in the art may use different methods to implement the described functions for each particular application, but it should not be considered that the implementation goes beyond the scope of this application.

In embodiments of this application, the communication apparatus may be divided into functional units based on the foregoing method example. For example, each functional unit may be obtained through division based on a corresponding function, or two or more functions may be integrated into one functional unit. For example, the communication apparatus may include a processing unit configured to perform a determining action in the foregoing method examples, a receiving unit configured to implement a receiving action in the foregoing method examples, and a sending unit configured to implement a sending action in the foregoing method examples. The integrated unit may be implemented in a form of hardware, or may be implemented in a form of a software functional unit. It should be noted that, unit division in this application is an example, and is merely logical function division. During actual implementation, another division manner may be used.

Figure 6:
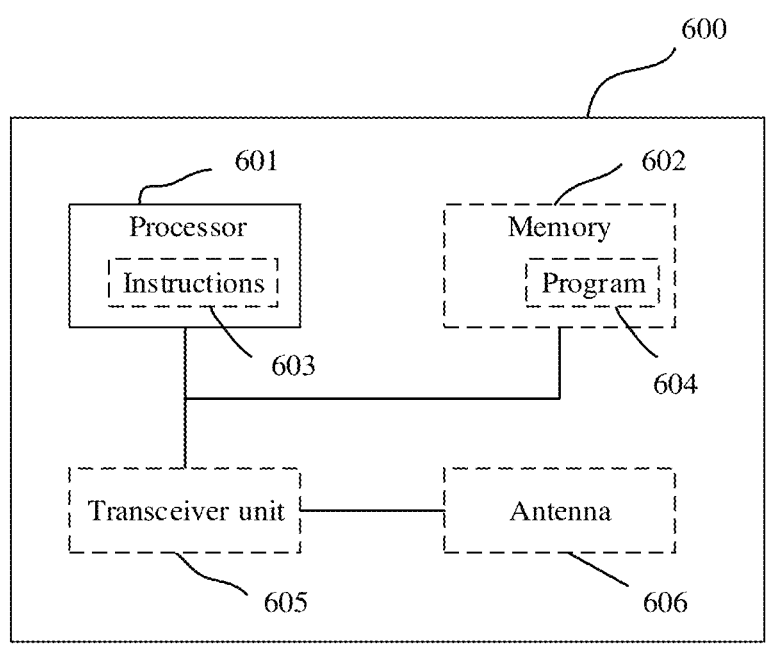
FIG. 6 is a schematic diagram of a communication apparatus according to an embodiment of this application.

FIG. 6 is a schematic structural diagram of a communication apparatus according to an embodiment of this application. The communication apparatus 600 may be configured to implement the method described in the foregoing method embodiments. The communication apparatus 600 may be a chip, a network device, or a terminal device.

The communication apparatus 600 includes one or more processors 601. The one or more processors 601 may support the communication apparatus 600 in implementing the method in the method embodiment shown in FIG. 3. The processor 601 may be a general-purpose processor or a dedicated processor. For example, the processor 601 may be a central processing unit (CPU) or a baseband processor. The baseband processor may be configured to process communication data (for example, the first indication information described above). The CPU may be configured to: control the communication apparatus (for example, a network device, a terminal device, or a chip), execute a software program, and process data of the software program. The communication apparatus 600 may further include a transceiver unit 605 that is configured to input (receive) and output (send) a signal.

For example, the communication apparatus 600 may be a chip, and the transceiver unit 605 may be an input and/or output circuit of the chip. Alternatively, the transceiver unit 605 may be a communication interface of the chip, and the chip may be used as a component of a terminal device, a network device, or another wireless communication device.

The communication apparatus 600 may include one or more memories 602. The memory 602 stores a program 604, and the program 604 may be run by the processor 601 to generate instructions 603, so that the processor 601 performs, based on the instructions 603, the methods described in the foregoing method embodiments. Optionally, the memory 602 may further store data. Optionally, the processor 601 may further read the data (for example, the to-be-sent data in the method 300) stored in the memory 602. The data and the program 604 may be stored at a same storage address, or the data and the program 604 may be stored at different storage addresses.

The processor 601 and the memory 602 may be disposed separately, or may be integrated together, for example, integrated on a board or integrated into a system on chip (SOC).

The communication apparatus 600 may further include the transceiver unit 605 and an antenna 606. The transceiver unit 605 may be referred to as a transceiver, or a transceiver circuit, and is configured to implement sending and receiving functions of the communication apparatus through the antenna 606.

In an example embodiment, the processor 601 is configured to send a higher layer message, first DCI, and second DCI to a terminal device by using the transceiver unit 605 and the antenna 606.

In another example embodiment, the processor 601 is configured to receive a higher layer message, first DCI, and second DCI from a network device by using the transceiver unit 605 and the antenna 606.

For a specific manner of receiving or sending "a higher layer message, first DCI, and second DCI", refer to related descriptions in the foregoing method embodiments.

It should be understood that steps in the foregoing method embodiments may be implemented by using a logic circuit in a form of hardware or instructions in a form of software in the processor 601. The processor 601 may be a CPU, a digital signal processor (DSP), an application-specific integrated circuit (ASIC), a field programmable gate array (FPGA) or another programmable logic device, for example, discrete gate, transistor logic device, or discrete hardware component.

Example embodiments of this application further provide a computer program product. When the computer program product is executed by a processor 601, the communication method according to any one of the method embodiments of this application is implemented.

The computer program product may be stored in a memory 602. For example, the computer program product is a program 604. After processing processes such as preprocessing, compilation, assembly, and linking, the program 604 is finally converted into an executable target file that can be executed by the processor 601.

Example embodiments of this application further provide a computer-readable storage medium. The computer-readable storage medium stores a computer program. When the computer program is executed by a computer, the communication method according to any one of the method embodiments of this application is implemented. The computer program may be a high-level language program, or may be an executable target program.

The computer-readable storage medium is, for example, a memory 602. The memory 602 may be a volatile memory or a nonvolatile memory, or the memory 602 may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through examples but not limitative descriptions, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct rambus dynamic random access memory (DR RAM).

Figure 7:
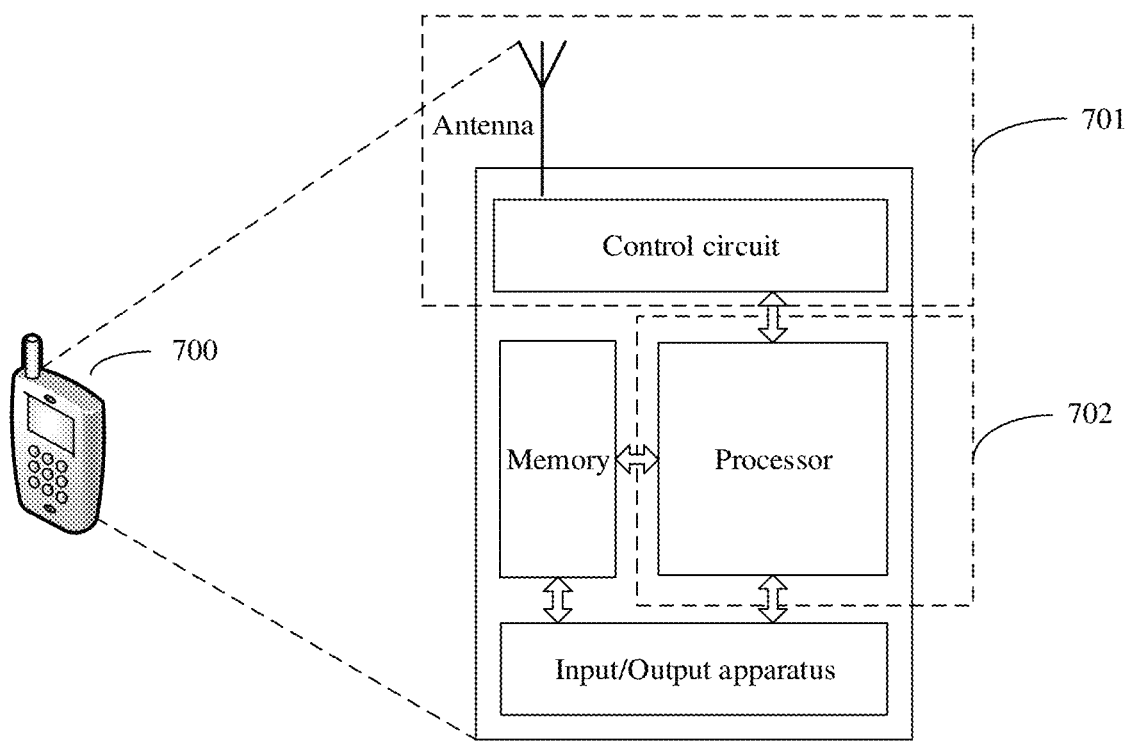
FIG. 7 is a schematic diagram of a terminal device according to an embodiment of this application.

The communication apparatus 600 may be a terminal device. FIG. 7 is a schematic structural diagram of a terminal device 700 according to an embodiment of this application. The terminal device 700 may be used in the system shown in FIG. 1, and implements functions of the terminal device in the foregoing method embodiments. For ease of description, FIG. 7 shows only main components of the terminal device.

As shown in FIG. 7, the terminal device 700 includes a processor, a memory, a control circuit, an antenna, and an input/output apparatus. The processor is mainly configured to: process a communication protocol and communication data, and control the entire terminal device. For example, the processor receives first indication information and second indication information by using the antenna and the control circuit. The memory is mainly configured to store a program and data, for example, store a communication protocol and to-be-sent data. The control circuit is mainly configured to: perform conversion between a baseband signal and a radio frequency signal, and process the radio frequency signal. A combination of the control circuit and the antenna may also be referred to as a transceiver that is mainly configured to send/receive a radio frequency signal in an electromagnetic wave form. The input/output apparatus, such as a touchscreen or a keyboard, is mainly configured to: receive data input by a user, and output data to the user.

After the terminal device is powered on, the processor may read the program in the memory, interpret and execute instructions included in the program, and process data in the program. When information needs to be sent through the antenna, the processor performs baseband processing on the to-be-sent information, and outputs a baseband signal to a radio frequency circuit. The radio frequency circuit performs radio frequency processing on the baseband signal to obtain a radio frequency signal, and sends the radio frequency signal in an electromagnetic wave form through the antenna. When an electromagnetic wave (namely, the radio frequency signal) carrying the information arrives at the terminal device, the radio frequency circuit receives the radio frequency signal through the antenna, converts the radio frequency signal into the baseband signal, and outputs the baseband signal to the processor. The processor converts the baseband signal into the information, and processes the information.

A person of ordinary skill in the art may understand that for ease of description, FIG. 7 shows only one memory and only one processor. In an actual terminal device, there may be a plurality of processors and a plurality of memories. The memory may also be referred to as a storage medium, a storage device, or the like. This is not limited in embodiments of this application.

In an optional implementation, the processor in FIG. 7 may integrate functions of a baseband processor and a CPU.

A person of ordinary skill in the art may understand that the baseband processor and the CPU may alternatively be independent processors, and are interconnected by using a technology such as a bus. A person of ordinary skill in the art may understand that the terminal device may include a plurality of baseband processors to adapt to different network standards, the terminal device may include a plurality of CPUs to improve a processing capability of the terminal device, and the components of the terminal device may be connected by using various buses. The baseband processor may also be referred to as a baseband processing circuit or a baseband processing chip. The CPU may also be referred to as a central processing circuit or a central processing chip. A function of processing the communication protocol and the communication data may be embedded into the processor, or may be stored in the memory in a form of a program, so that the processor executes the program in the memory to implement a baseband processing function.

In an embodiment of this application, the antenna and the control circuit that have sending and receiving functions may be considered as a transceiver unit 701 of the terminal device 700. The transceiver unit 701 is configured to support the terminal device in implementing a receiving function in the method embodiment, or is configured to support the terminal device in implementing a sending function in the method embodiment. The processor that has a processing function is considered as a processing unit 702 of the terminal device 700. As shown in FIG. 7, the terminal device 700 includes the transceiver unit 701 and the processing unit 702. The transceiver unit may also be referred to as a transceiver, a transceiver machine, a transceiver apparatus, or the like. Optionally, a device that is configured to implement the receiving function and that is in the transceiver unit 701 may be considered as a receiving unit, and a device that is configured to implement the sending function and that is in the transceiver unit 701 may be considered as a sending unit. That is, the transceiver unit 701 includes the receiving unit and the sending unit. The receiving unit may also be referred to as a receiver, an input port, a receiving circuit, or the like. The sending unit may be referred to as a transmitter, a transmitter, a transmitting circuit, or the like.

The processor 702 may be configured to execute the program stored in the memory, to control the transceiver unit 701 to receive a signal and/or send a signal, to complete a function of the terminal device in the foregoing method embodiments. In an implementation, a function of the transceiver unit 701 may be implemented by using a transceiver circuit or a transceiver-dedicated chip.

Figure 8:
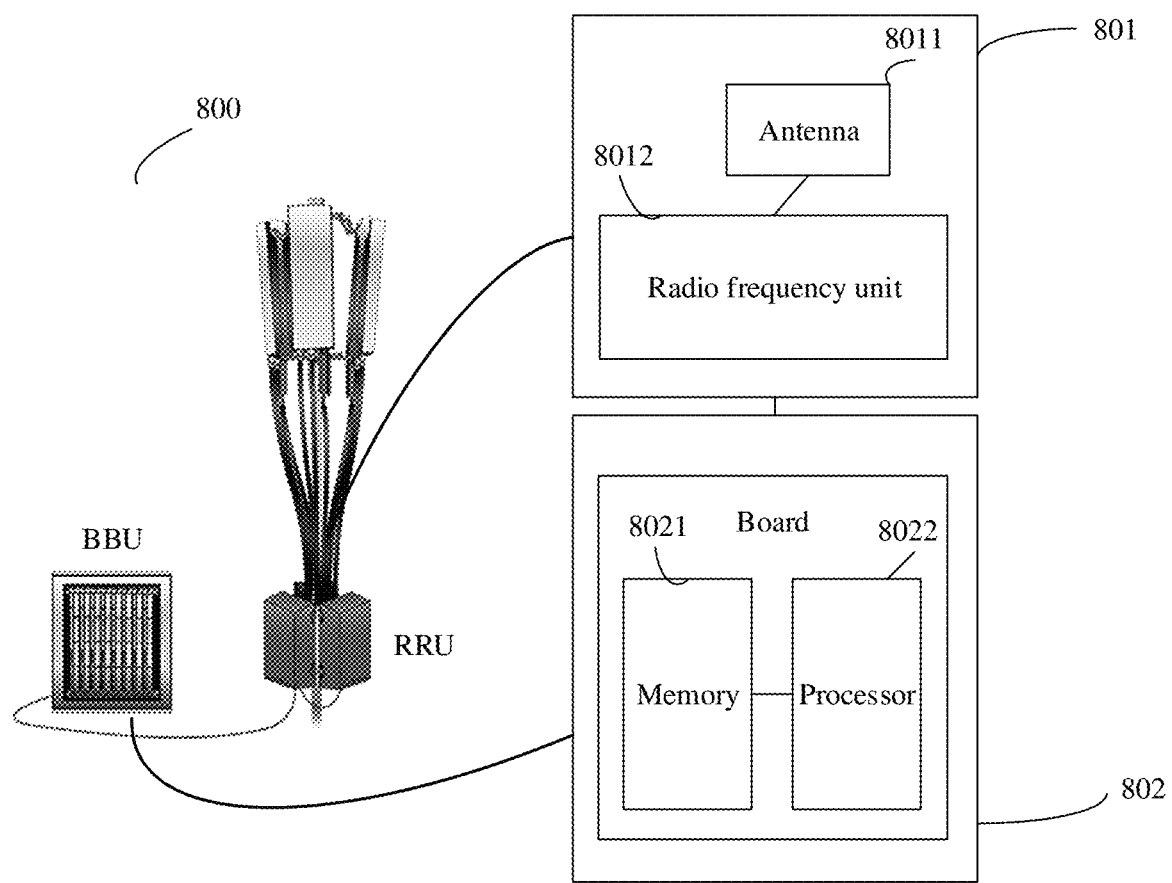
FIG. 8 is a schematic diagram of a network device according to an embodiment of this application.

When the communication apparatus 600 is a network device, FIG. 8 is a schematic structural diagram of a network device according to an embodiment of this application. The network device may be, for example, a base station. As shown in FIG. 8, the base station may be used in the system shown in FIG. 1, to implement a function of the network device in the foregoing method embodiment. The base station 800 may include one or more radio frequency units, for example, a remote radio unit (RRU) 801 and at least one baseband unit (BBU) 802. The BBU 802 may include a distributed unit (DU), or may include a DU and a centralized unit (CU).

The RRU 801 may be referred to as a transceiver unit, a transceiver, or a transceiver circuit, and may include at least one antenna 8011 and a radio frequency unit 8012. The RRU 801 is mainly configured to perform receiving and sending of a radio frequency signal and conversion between a baseband signal and a radio frequency signal, for example, configured to support the base station in implementing a sending function and a receiving function in the method embodiment. The BBU 802 is mainly configured to: perform baseband processing, control the base station, and the like. The RRU 801 and the BBU 802 may be physically disposed together, or may be physically separated, namely, a distributed base station.

The BBU 802 may also be referred to as a processing unit, and is mainly configured to complete a baseband processing function, such as channel coding, multiplexing, modulation, or spreading. For example, the BBU 802 may be configured to control the base station to perform an operation procedure related to the network device in the foregoing method embodiment.

The BBU 802 may include one or more boards. A plurality of boards may jointly support a radio access network (for example, a long term evolution (LTE) network) of a single access standard, or may separately support radio access networks (for example, an LTE network and an NR network) of different access standards. The BBU 802 further includes a memory 8021 and a processor 8022. The memory 8021 is configured to store necessary instructions and necessary data. For example, the memory 8021 stores various types of instruction information in the foregoing method embodiment. The processor 8022 is configured to control the base station to perform a necessary action, for example, is configured to control the base station to perform the operation procedure in the foregoing method embodiment. The memory 8021 and the processor 8022 may serve one or more boards. In other words, a memory and a processor may be separately disposed on each board. Alternatively, a plurality of boards may share a same memory and a same processor. In addition, a necessary circuit may be further disposed on each board.

It should be noted that the base station shown in FIG. 8 is merely an example, and a network device applicable to an embodiment of this application may alternatively be an active antenna unit (AAU) in an active antenna system (AAS).

It may be clearly understood by a person of ordinary skill in the art that, for the purpose of convenient and brief description, for a specific working process of the foregoing system, apparatus, and unit, refer to a corresponding process in the foregoing method embodiment.

In the several embodiments described in this application, the disclosed system, apparatus and method may be implemented in another manner. For example, some features of the method embodiment described above may be ignored or not performed. The described apparatus embodiments are merely examples. For example, the division into units is merely logical function division and there may be another division during actual implementation. A plurality of units or components may be combined or integrated into another system. In addition, a coupling between the units or a coupling between the components may be a direct coupling, or may be an indirect coupling. The foregoing coupling includes an electrical connection, a mechanical connection, or a connection in another form.

It needs to be understood that sequence numbers of the foregoing processes do not mean execution sequences in the various embodiments of this application. The execution sequences of the processes should be determined based on functions and internal logic of the processes, and should not be construed as any limitation on the implementation processes of the embodiments of this application.

In addition, the terms "system" and "network" may be used interchangeably in this specification. The term "and/or" in this specification is merely an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

In summary, what is described above is merely example embodiments of the technical solutions of this application, but is not intended to limit the protection scope, which is intended to cover any modification, equivalent replacement, or improvement made without departing from the spirit and principle of this application. The claims shall define the protection scope.

What is claimed is:

1. A communication method performed by a terminal device, comprising:
    receiving a higher layer message, wherein the higher layer message configures a transmission resource, on which data of at least three transmission priorities can be transmitted;
    receiving first downlink control information, wherein the first downlink control information indicates a first transmission resource in the transmission resource;
    receiving second downlink control information, wherein the second downlink control information indicates a transmission priority, of the at least three transmission priorities, corresponding to a second transmission resource in the transmission resource;
    determining whether to-be-transmitted data is uplink data or downlink data; and
    upon determination that to-be-transmitted data is uplink data, determining, based on a transmission priority of the uplink data and the transmission priority indicated by the second downlink control information, whether to send the uplink data on an overlapping resource of the first transmission resource and the second transmission resource, and/or
    upon determination that the to-be-transmitted data is downlink data, determining, based on a transmission priority of the downlink data and the transmission priority indicated by the second downlink control information, whether the downlink data exists on the overlapping resource of the first transmission resource and the second transmission resource.

2. The method according to claim 1, wherein the determining, based on a transmission priority of the uplink data and the transmission priority indicated by the second downlink control information, whether to send the uplink data on an overlapping resource of the first transmission resource and the second transmission resource comprises:
    determining whether the transmission priority of the uplink data belongs to the transmission priority indicated by the second downlink control information; and
    upon determination that the transmission priority of the uplink data belongs to the transmission priority indicated by the second downlink control information, determining to send the uplink data on the overlapping resources; or
    upon determination that the transmission priority of the uplink data does not belong to the transmission priority indicated by the second downlink control information, determining not to send the uplink data on the overlapping resource.

3. The method according to claim 1, wherein the determining, based on a transmission priority of the downlink data and the transmission priority indicated by the second downlink control information, whether the downlink data exists on the overlapping resource of the first transmission resource and the second transmission resource comprises:
    determining whether the transmission priority of the downlink data belongs to the transmission priority indicated by the second downlink control information; and
    upon determination that the transmission priority of the downlink data belongs to the transmission priority indicated by the second downlink control information, determining that the downlink data exists on the overlapping resource, or
    upon determination that the transmission priority of the downlink data does not belong to the transmission priority indicated by the second downlink control information, determining that the downlink data does not exist on the overlapping resource.

4. The method according to claim 3, further comprising:
    upon determination that the downlink data exists on the overlapping resource, receiving the downlink data on the overlapping resource; or
    upon determination that the downlink data does not exist on the overlapping resource, skipping receiving the downlink data on the overlapping resource.

5. The method according to claim 1, wherein the transmission priority indicated by the second downlink control information is only one of the at least three transmission priorities.

6. The method according to claim 5, wherein the receiving second downlink control information comprises:
    receiving the second downlink control information based on the transmission priority of the uplink data, wherein the transmission priority indicated by the second downlink control information is the transmission priority of the uplink data; and/or
    receiving the second downlink control information based on the transmission priority of the downlink data, wherein the transmission priority indicated by the second downlink control information is the transmission priority of the downlink data.

7. The method according to claim 5, wherein the transmission priority indicated by the second downlink control information is a non-highest priority.

8. The method according to claim 1, wherein when the to-be-transmitted data is to-be-initially-transmitted data, the first downlink control information indicates a transmission priority of the to-be-transmitted data by using a code block group transmission information (CBGTI) field, or the first downlink control information indicates a transmission priority of the to-be-transmitted data by using a combination of a CBGTI field and a code block group flushing out information (CBGFI) field.

9. An apparatus, comprising: at least one processor and at least one memory storing instructions that, when executed by the at least one processor, cause the apparatus to perform operations comprising:
    receiving a higher layer message, wherein the higher layer message configures a transmission resource, on which data of at least three different transmission priorities can be transmitted;
    receiving first downlink control information, wherein the first downlink control information indicates a first transmission resource in the transmission resource;
    receiving second downlink control information, wherein the second downlink control information indicates a transmission priority, of the at least three transmission priorities, corresponding to a second transmission resource in the transmission resource;

determining whether to-be-transmitted data is uplink data or downlink data; and upon determination that to-be-transmitted data is uplink data, determining, based on a transmission priority of the uplink data and the transmission priority indicated by the second downlink control information, whether to send the uplink data on an overlapping resource of the first transmission resource and the second transmission resource, and/or upon determination that the to-be-transmitted data is downlink data, determining, based on a transmission priority of the downlink data and the transmission priority indicated by the second downlink control information, whether the downlink data exists on the overlapping resource of the first transmission resource and the second transmission resource.

10. The apparatus according to claim 9, wherein the determining, based on a transmission priority of the uplink data and the transmission priority indicated by the second downlink control information, whether to send the uplink data on an overlapping resource of the first transmission resource and the second transmission resource comprises:

determining whether the transmission priority of the uplink data belongs to the transmission priority indicated by the second downlink control information; and upon determination that transmission priority of the uplink data belongs to the transmission priority indicated by the second downlink control information, determining to send the uplink data on the overlapping resource, or upon determination that when the transmission priority of the uplink data does not belong to the transmission priority indicated by the second downlink control information, determining not to send the uplink data on the overlapping resource.

11. The apparatus according to claim 9, wherein the determining, based on a transmission priority of the downlink data and the transmission priority indicated by the second downlink control information, whether the downlink data exists on the overlapping resource of the first transmission resource and the second transmission resource comprises:

determining whether the transmission priority of the downlink data belongs to the transmission priority indicated by the second downlink control information; and upon determination that the transmission priority of the downlink data belongs to the transmission priority indicated by the second downlink control information, determining that the downlink data exists on the overlapping resource, or upon determination that the transmission priority of the downlink data does not belong to the transmission priority indicated by the second downlink control information, determining that the downlink data does not exist on the overlapping resource.

12. The apparatus according to claim 9, wherein the operations further comprise:

upon determination that the downlink data exists on the overlapping resource, receiving the downlink data on the overlapping resource; or upon determination that the downlink data does not exist on the overlapping resource, skipping receiving the downlink data on the overlapping resource.

13. The apparatus according to claim 9, wherein the transmission priority indicated by the second downlink control information is only one of the at least three transmission priorities.

14. The apparatus according to claim 13, wherein the receiving second downlink control information comprises:

receiving the second downlink control information based on the transmission priority of the uplink data, wherein the transmission priority indicated by the second downlink control information is the transmission priority of the uplink data; and/or receiving the second downlink control information based on the transmission priority of the downlink data, wherein the transmission priority indicated by the second downlink control information is the transmission priority of the downlink data.

15. The apparatus according to claim 13, wherein the transmission priority indicated by the second downlink control information is a non-highest priority.

16. The apparatus according to claim 9, wherein when the to-be-transmitted data is to-be-initially-transmitted data, the first downlink control information indicates a transmission priority of the to-be-transmitted data by using a code block group transmission information (CBGTI) field, or the first downlink control information indicates a transmission priority of the to-be-transmitted data by using a combination of a CBGTI field and a code block group flushing out information (CBGFI) field.

17. An apparatus, comprising: at least one processor and at least one memory storing instructions, that, when executed by the at least one processor, cause the apparatus to perform operations comprising:

sending a higher layer message, wherein the higher layer message configures a transmission resource, on which data of at least three different transmission priorities can be transmitted;

sending first downlink control information, wherein the first downlink control information indicates a first transmission resource in the transmission resource; and sending second downlink control information, wherein the second downlink control information indicates a transmission priority, of the at least three transmission priorities, corresponding to a second transmission resource in the transmission resource.

18. The apparatus according to claim 17, wherein the transmission priority indicated by the second downlink control information is only one of the at least three transmission priorities.

19. The apparatus according to claim 18, wherein the transmission priority indicated by the second downlink control information is a non-highest priority.

20. The apparatus according to claim 17, wherein during initial transmission, the first downlink control information indicates a transmission priority of to-be-transmitted data by using a code block group transmission information (CBGTI) field, or the first downlink control information indicates a transmission priority of to-be-transmitted data by using a combination of a CBGTI field and a code block group flushing out information (CBGFI) field.

\* \* \* \* \*

UNITED STATES PATENT AND TRADEMARK OFFICE
CERTIFICATE OF CORRECTION

PATENT NO. : 11,968,707 B2
APPLICATION NO. : 17/466635
DATED : April 23, 2024
INVENTOR(S) : Shurong Jiao It is certified that error appears in the above-identified patent and that said Letters Patent is hereby corrected as shown below:

In the Claims

Column 25, Claim 2, Line 14, change "resources" to --resource--;

Column 27, Claim 10, Line 10, change "that transmission" to --that the transmission--; and Column 27, Claim 10, Line 15, change "that when the transmission" to --that the transmission--.

Signed and Sealed this
Twenty-first Day of May, 2024

Katherine Kelly Vidal
*Director of the United States Patent and Trademark Office*